United States Patent

Bradley et al.

[11] Patent Number: 5,805,067
[45] Date of Patent: Sep. 8, 1998

[54] COMMUNICATION TERMINAL HAVING DETECTOR METHOD AND APPARATUS FOR SAFE WIRELESS COMMUNICATION

[75] Inventors: James Frederick Bradley, Middletown; Paul W. Cooper, Red Bank, both of N.J.

[73] Assignee: AT&T Corp, Middletown, N.J.

[21] Appl. No.: 774,453

[22] Filed: Dec. 30, 1996

[51] Int. Cl.[6] .................................................. G08B 21/00
[52] U.S. Cl. .................... 340/635; 340/552; 343/894; 455/90; 455/129
[58] Field of Search ................................. 340/552, 635, 340/541, 572, 573; 455/89, 90, 129; 343/894, 760, 703

[56] References Cited

U.S. PATENT DOCUMENTS

| | | | |
|---|---|---|---|
| 4,931,802 | 6/1990 | Assal et al. | 342/356 |
| 4,949,074 | 8/1990 | D'Ambrosia et al. | 340/552 |
| 4,967,183 | 10/1990 | D'Ambrosia et al. | 340/552 |
| 5,257,405 | 10/1993 | Reitberger | 455/54.1 |
| 5,440,290 | 8/1995 | McCullough et al. | 340/552 |
| 5,623,269 | 4/1997 | Hirshfield et al. | 342/354 |

*Primary Examiner*—Thomas Mullen
*Assistant Examiner*—Ashok Mannava

[57] ABSTRACT

A proximity detector detects objects which may interfere with a wireless antenna beam. The proximity detector includes infrared sensors, sonar detectors, motion detectors and optical devices to determine a range and bearing of objects that may interfere with the antenna beam.

When an object may be harmed or interfere with the antenna beam, an alarm may be activated to warn the user and/or the object of potential harm from the electro-magnetic energy transmitted by the directed antenna. Also, based on the proximity detector's outputs, an antenna beam pattern may be changed to reduce the power at the object or the transmitted power may be reduced to prevent harm to the object.

18 Claims, 15 Drawing Sheets

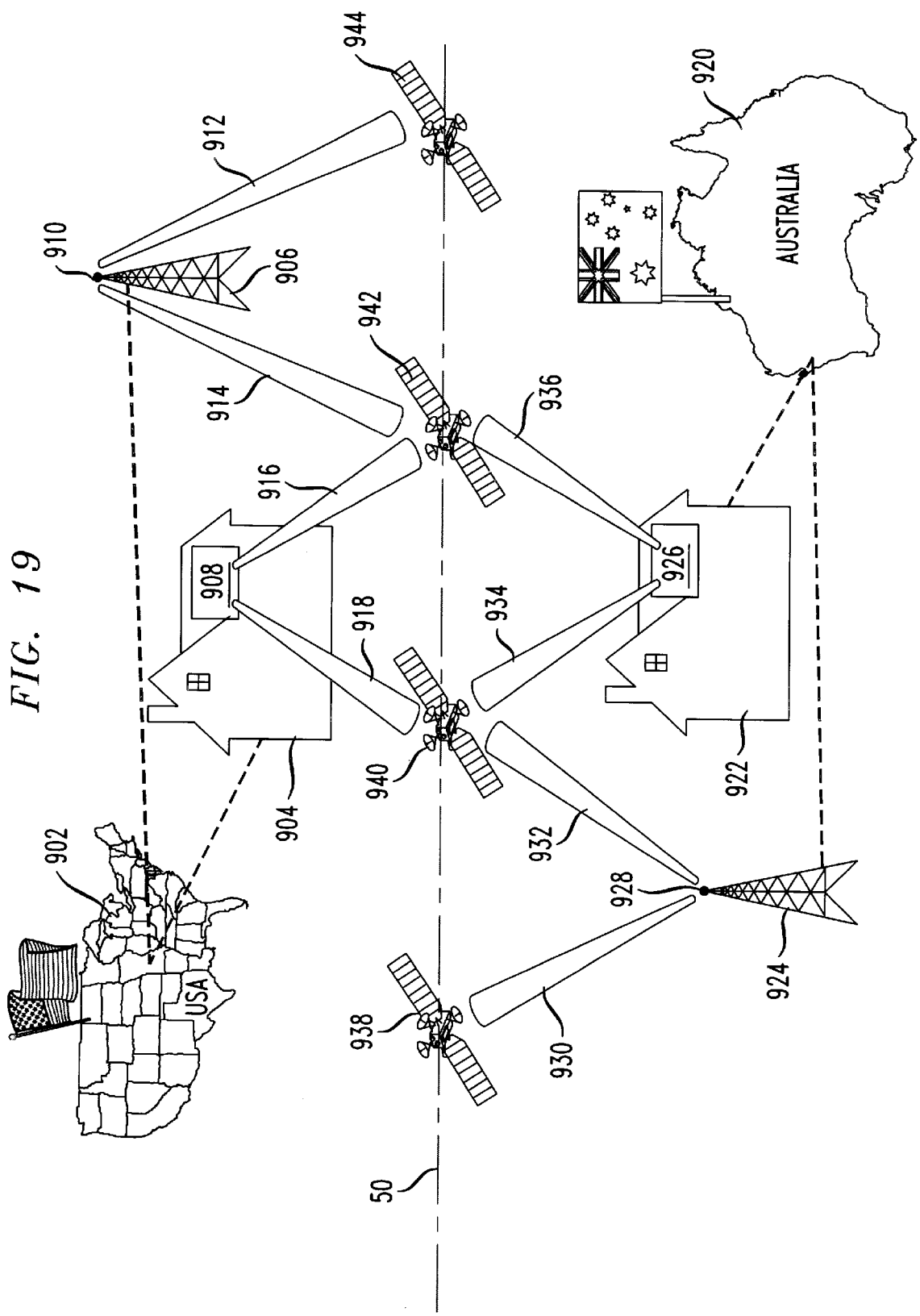

COMMUNICATION TERMINAL HAVING DETECTOR METHOD AND APPARATUS FOR SAFE WIRELESS COMMUNICATION

BACKGROUND OF THE INVENTION

1. Field of the Invention

This invention relates to proximity detectors used in conjunction with wireless communications.

2. Background of the Invention

Currently, mobile communication terminals such as cellular phones wirelessly communicate with base stations which in turn may connect a call to geographically distant locations through satellites. However, when cellular phones are too distant from a base station, a communication path cannot be completed between the cellular phone and the base station leaving a caller undesirably stranded without ability to communicate.

Conventional cellular phones cannot communicate directly with satellites when too distant from the base stations partially because the power required to reach a satellite is beyond the capability of a cellular phone. In addition, if sufficient power is available, the electromagnetic energy output from the cellular phone antenna may be harmful to the user of the cellular phone as well as to others who are in close proximity to the cellular phone.

SUMMARY OF THE INVENTION

This invention provides a proximity detector that detects objects that may interfere with an antenna beam formed by a satellite phone or a fixed location antenna. An exemplary embodiment of the proximity detector may include infrared sensors, sonar detectors, motion detectors and optical devices to determine range and bearing of objects that may interfere with the antenna beam. If an object is detected within a predetermined distance of the antenna beam, the antenna controller may alternatively reshape the antenna beam to avoid the object, redirect the antenna beam to a different satellite to avoid the object or reduce the power output of the antenna beam to prevent harming the object. Also, the antenna controller may activate an alarm to warn the user of the satellite phone and/or the object of the potential interference of the antenna beam and possible harm from the electro-magnetic energy transmitted by the directed antenna.

BRIEF DESCRIPTION OF THE DRAWINGS

The invention is described in detail with reference to the following drawings, wherein like numerals represent like elements and wherein:

FIG. 19 is a diagram of a communication system that includes phased array antennas that are mounted on fixed structures.

DETAILED DESCRIPTION OF THE PREFERRED EMBODIMENTS

Figure 1:
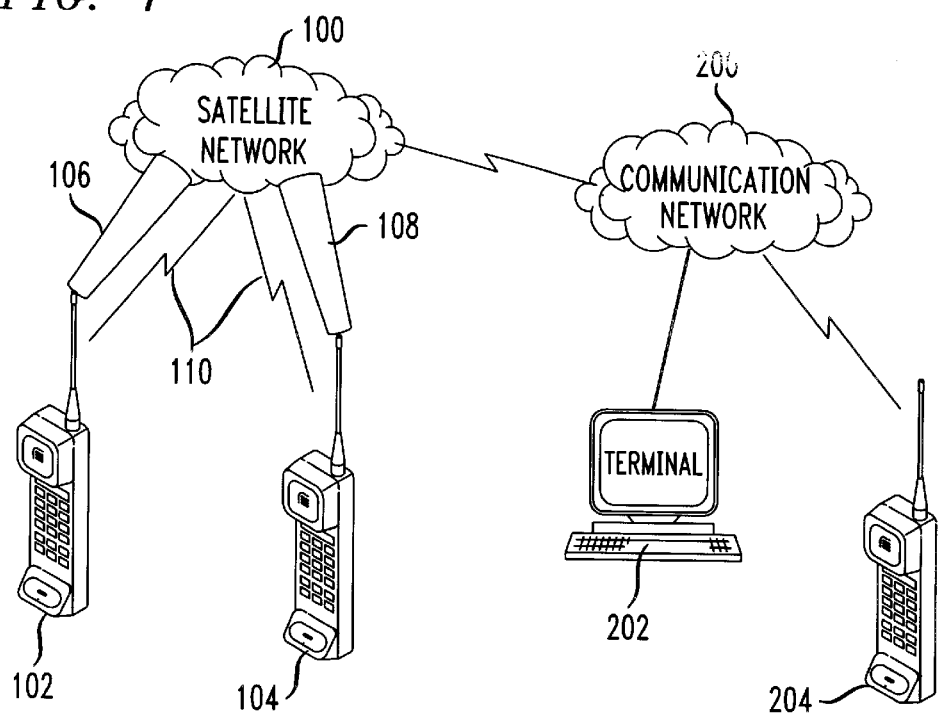
FIG. 1 is a diagram of a communication system using direct satellite links.

FIG. 1 shows a communication system that includes portable satellite phones 102 and 104 communicating with a satellite network 100. The portable satellite phones 102 and 104 form antenna beams 106 and 108 that are directed toward satellites of the satellite network 100. The portable satellite phones 102 and 104 receive Global Positioning System (GPS) signals 110 through GPS receivers included in the portable satellite phones 102 and 104. Satellites of the satellite network 100 may communicate with calling and called parties directly through the portable satellite phones or through a ground based communication network 200 to complete a communication path. Whether a called party is reached through either the portable satellite phone 102 or 104 or the ground based communication network 200 is determined by known methods such as specially assigned numbers. If a conventional telephone number is used, the ground based communication network 200 may connect to terminal 202 (which may be a telephone station or other devices such as a facsimile device) or to mobile units 204 such as cellular phones to reach the called party.

Figure 2:
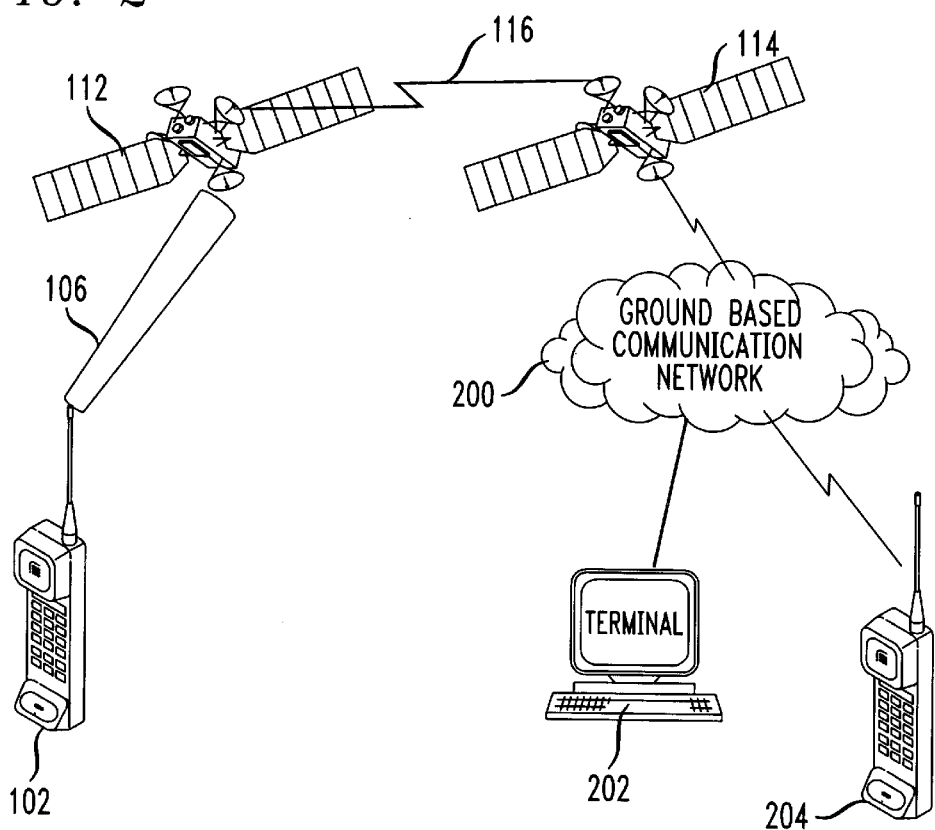
FIG. 2 is a diagram of a portable satellite phone communicating via satellite with a ground based communication system.

When a calling party uses the portable satellite phone 102 and calls a called party by dialing a conventional telephone number, the portable satellite phone 102 selects a satellite of the satellite network 100 and forms an antenna beam directed to the selected satellite, as shown in FIG. 2. The selected satellite either directly or through other satellites of the satellite network 100 links to the ground based communication network 200 by well known methods and completes the communication path between the portable satellite phone 102 and a telephone station such as terminal 202 of the called party that is coupled to the ground based communication network 200.

Figure 3:
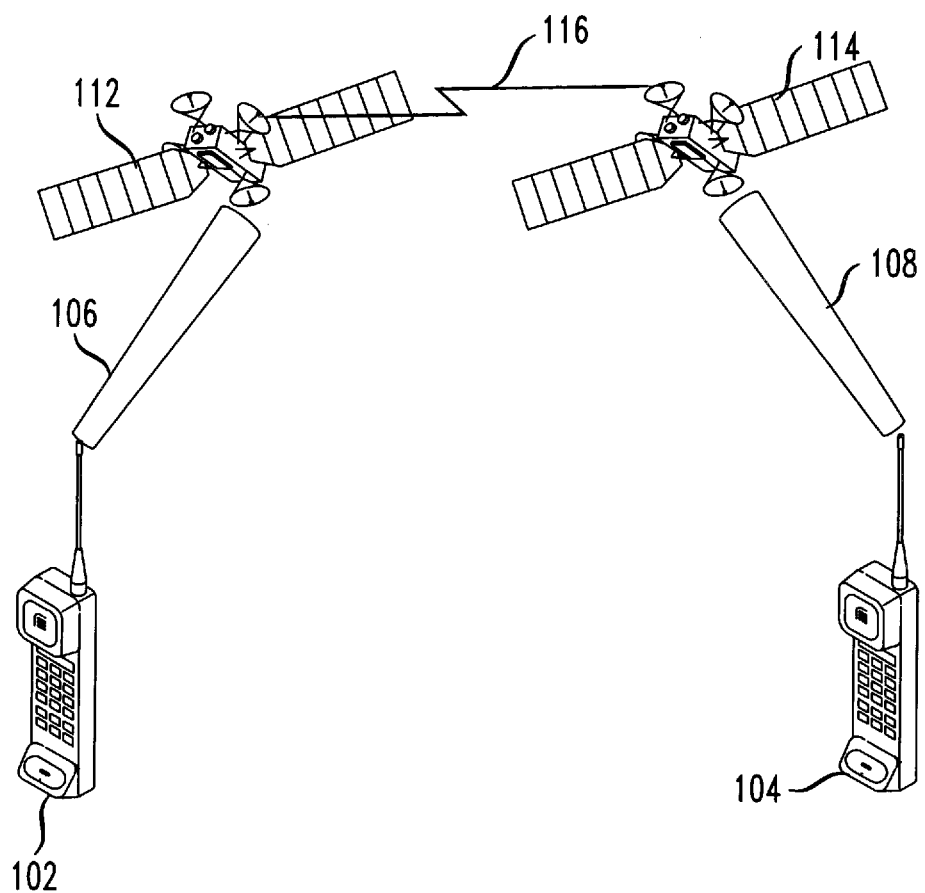
FIG. 3 is a diagram of a portable satellite phone communicating with another portable satellite phone.
Figure 4A:
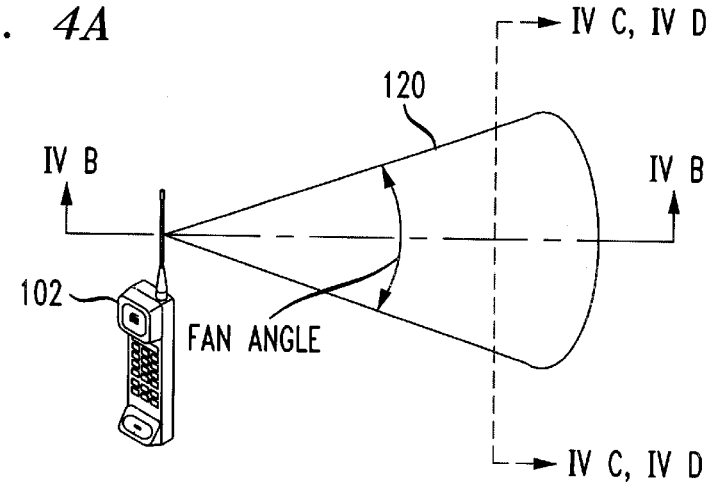
FIGS. 4A–4D show a fan beam and the fan beam cross-sections.
Figure 4B:
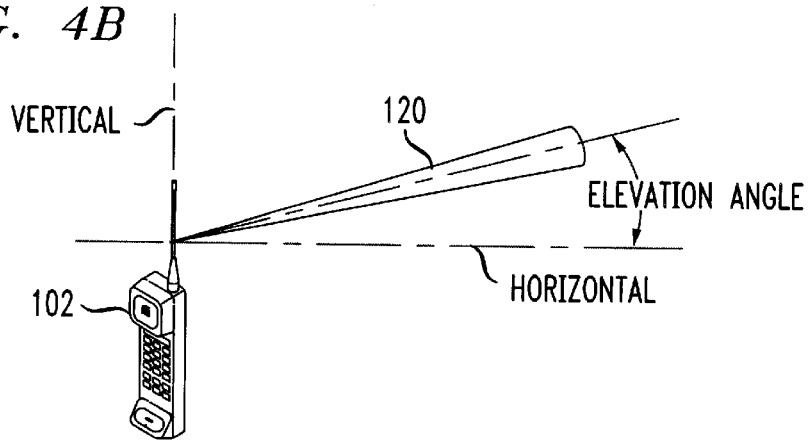
Figure 4C:
Figure 4D:

When the calling party dials a number assigned to the portable satellite phone 104, for example, the portable satellite phone 104 is alerted of the call by a destination satellite of the satellite network 100, as shown in FIG. 3. The destination satellite and the selected satellite may be the same satellite if the portable satellite phone 104 is reachable by the selected satellite. Otherwise, the selected satellite must link to the destination satellite (perhaps through yet other satellites) to complete the communication path to the called party's portable satellite phone 104.

Normally, the portable satellite phone 104 is placed in a standby mode and may receive alert signals from satellites serving the geographical area where the portable satellite phone 104 is located. When the portable satellite phone 104 detects an alert signal from the destination satellite, the portable satellite phone 104 alerts the called party that an incoming call is received. When the called party activates the portable satellite phone 104 by turning it on, the portable satellite phone 104 forms an antenna beam directed at the destination satellite and establishes a connection to complete the call.

The portable satellite phones 102 and 104 communicate with satellites directly by forming highly directed antenna beams directed at a specific satellite. In this way, the amount of power required to communicate with a satellite is reduced. In addition, because the electromagnetic energy is concentrated in a narrow antenna beam, the area affected by the electromagnetic energy is reduced, thus reducing the possibility of harmful effects to persons that may be in the neighborhood of the portable satellite phone.

The portable satellite phones 102 and 104 must accurately determine their individual position/bearing-attitude and the position of the selected or destination satellite to form the antenna beam. The portable satellite phones 102 and 104 determine their own positions (latitude and longitude) by sensing GPS signals 110 transmitted by either GPS satellites or satellites of the satellite network 100.

The portable satellite phones 102 and 104 include a database of satellite positions and a schedule of when a specific satellite may be within the range of the portable satellite phones 102 and 104. The portable satellite phones 102 and 104 include clocks so that accurate satellite positions may be determined at any time. Thus, the portable satellite phones 102 and 104 may be able to determine the positions of possible satellites that can provide the desired communications links. Also, alternatively, satellites may transmit a tracking signal or specific position information to assist the portable satellite phones 102 and 104 to locate a satellite's exact position.

In addition to their position, the portable satellite phones 102 and 104 determine a bearing (direction such as North, South, East or West) and attitude (direction relative to vertical) of the portable satellite phones 102 and 104. Based on the positions/bearings/attitudes of the portable satellite phones 102 and 104 and the positions of the satellites, the portable satellite phones 102 and 104 determine the exact relative position between the portable satellite phones 102 and 104 and the selected/destination satellite so that an antenna beam may be formed directed at the desired satellite.

For less expensive versions of the portable satellite phones 102 and 104, bearing and attitude detection could be omitted. For these simpler portable satellite phones 102 and 104, the portable satellite phones 102 and 104 must be positioned so that an antenna beam may be directed to a satellite for communication. In particular, the portable satellite phones 102 and 104 may be maintained in an erect or vertical position and need be orientated approximately in a proper bearing to allow the portable satellite phones 102 and 104 to form an antenna beam toward a satellite, for example.

For this simple case, based on the geographical position of the portable satellite phones 102 and 104 determined from the GPS position coordinates, the portable satellite phones 102 and 104 may indicate to the user which bearing to orientate the portable satellite phones 102 and 104. For example, the portable satellite phones 102 and 104 may have four LEDs to indicate North, South, East and West or even finer even more precise indications.

For the above lower cost embodiment, the portable satellite phones 102 and 104 may form a fan beam 120 having generally rectangular or elliptical cross-sections, as shown in FIGS. 4A–4D using portable satellite phone 102 as an example. The fan beam is directed at an elevation angle determined by the GPS coordinates of the portable satellite phones 102 and 104 and the satellite position and has a fan angle that provides a large relative bearing range between the satellite and the portable satellite phones 102 and 104. The fan angle may be any value limited only by the user's body (head) so that physical harm from exposure to the fan beam is avoided. A fan angle range of about 60 to 120 degrees would be preferred. Thus, the fan beam 120 permits the portable satellite phones 102 and 104 to communicate with a satellite without depending on exact bearing and attitude information.

When the above low cost embodiment is turned on and the fan beam reaches a satellite, a dial tone is generated to indicate to the user that a communication path is established. However, if a satellite cannot be reached, a dial tone is not generated. The user may reorientate the portable satellite phones 102 and 104 in a different bearing until the communication path is established and a dial tone is generated.

The portable satellite phones 102 and 104 are provided with proximity detectors. When an object, such as a person, comes within a predetermined distance of the antenna beam and/or the portable satellite phones 102 and 104, the portable satellite phones 102 and 104 may either reshape or redirect the antenna beam to avoid the object or reduce the transmitted power of the antenna beam to avoid causing harm to the object.

In addition, the portable satellite phones 102 and 104 may also activate an alarm to warn the object or the user of the portable satellite phones 102 and 104 to avoid the antenna beam. When a user of the portable satellite phone 102, for example, moves the portable satellite phone 102 in an orientation where the antenna beam is blocked by the user or objects that cannot be moved, the portable satellite phone 102 may use the alarm to request the user to reorientate the portable satellite phone 102 so that an antenna beam may be properly directed away from the interfering object and toward the desired satellite.

Figure 5:
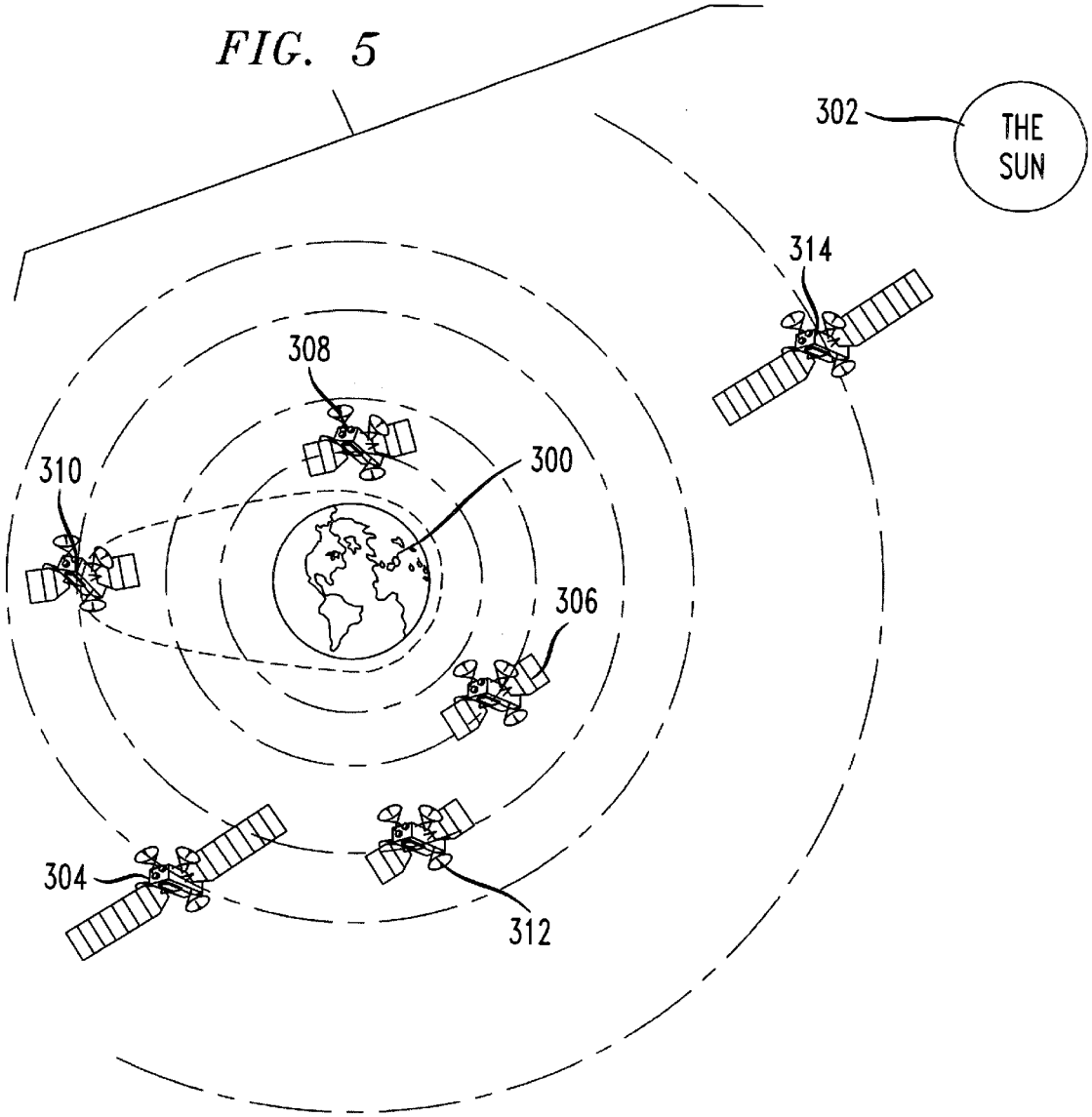
FIG. 5 is a diagram showing possible communication satellites.

FIG. 5 shows possible communication satellites that may be a part of the satellite network 100. A geostationary earth orbit (GEO) satellite 304 is a satellite that is placed in an orbit so that the satellite maintains a fixed position relative to the surface of the earth 300. A medium altitude earth orbit (MEO) and low altitude earth orbit (LEO) satellites 306 and 308 are satellites that may be in motion relative to the surface of the earth. These satellites are closer to the surface of the earth 300 as compared to the GEO satellite 304. Because of the shorter distance to the surface of the earth 300, less power is required to establish communication using the MEO and LEO's, however, the portable satellite phones 102 and 104 must account for the changing positions of the satellites and occasionally transition from a first satellite to a second satellite when the first satellite position moves out of range of the portable satellite phones 102 and 104.

A highly elliptical orbit (HEO) satellite 310 forms an elliptical orbit around the earth 300 as compared to the approximately circular orbit formed by the other satellites. A GEO-helio synchronous orbit (BradCo) satellite 311 is positioned in an orbit around the sun 302 and maintains a fixed position relative to the earth 300. An intermediate circular orbit (ICO) satellite 312 is positioned in a circular orbit around the earth 300 at an altitude in between the MEO and LEO 306 and 308 and the GEO 304 satellites. All of the above satellites 304–314 may be utilized to form the satellite network 100.

Figure 6:
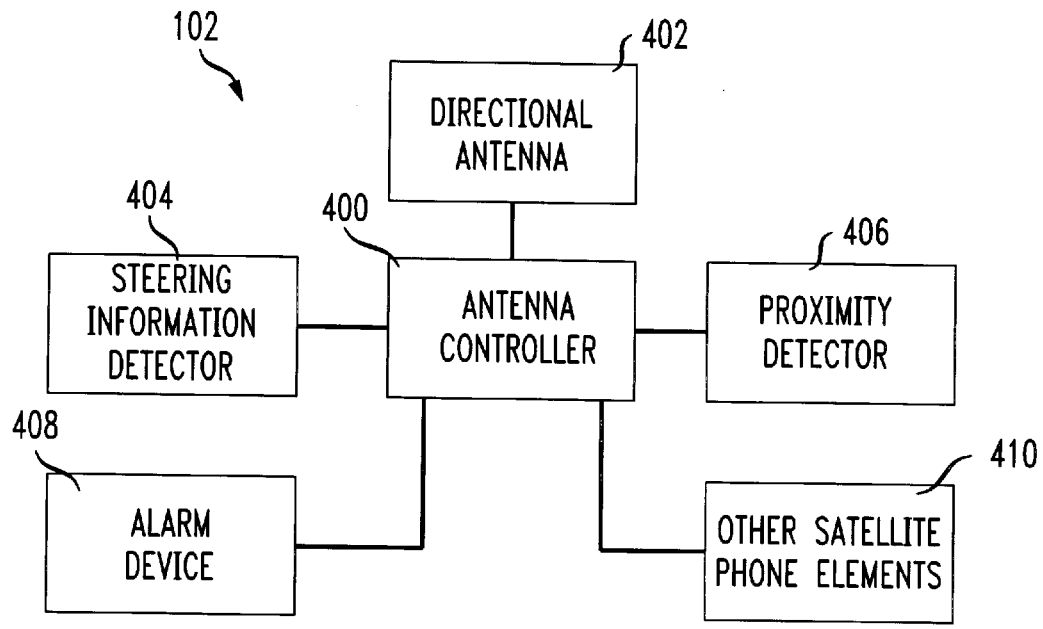
FIG. 6 is a block diagram of a portable satellite phone unit.

FIG. 6 shows a block diagram of the portable satellite phone 102. The portable satellite phone 102 includes an antenna controller 400 connected to a directional antenna 402. A steering information detector 404, a proximity detector 406, an alarm device 408 and other portable satellite phone elements 410 are all coupled to the antenna controller 400.

When the antenna controller 400 receives an instruction from the other portable satellite phone elements 410 to establish communication with the satellite network 100, the antenna controller 400 selects a satellite of the satellite network 100 and determines a position of the satellite by consulting the database contained in the portable satellite phone 102. The antenna controller 400 may also select a satellite by scanning for available satellites within reachable range. A set of preassigned communication channels may be assigned for satellites to broadcast their positions and availability information. Satellites newly added to the satellite network may use these channels to announce their availability especially to portable satellite phones 102 having older databases. The antenna controller 400 also determines the position/bearing/attitude of the portable satellite phone 102 via the steering information detector 404. Based on the position of the selected satellite and the position/bearing/attitude of the portable satellite phone 102, the antenna controller forms an antenna beam that is directed toward the selected satellite using the directional antenna 402 to establish a communication path to the selected satellite.

During call setup and after the communication path with the selected satellite is established, the antenna controller monitors for beam blockage by objects such as a person using the proximity detector 406. When the proximity detector 406 detects a person within a predetermined distance from the communication path, the antenna controller 400 may take one of several alternative actions to avoid harming the person that may be caused by the electromagnetic energy transmitted by the directional antenna 402.

The antenna controller 400 may reduce the power level transmitted by the directional antenna 402 to avoid harming the person. If the power level is reduced below a level required for communication with the selected satellite, the antenna controller 400 alerts the user of the portable satellite phone 102 through the alarm device 408. The antenna controller 400 may also determine whether the antenna beam may be reshaped so as to avoid harming the person or whether another satellite may be selected to avoid harming the person.

For example, a circular cross-section antenna beam pattern may be modified into an asymmetric cross-section to reduce the received power level at the person while maintaining the power density in the satellite direction. The actual antenna beam patterns necessary to satisfy these conditions will vary depending on the angular separation between the satellite and the intercepting person, as well as the person's distance from the phone's antenna.

Figure 7:
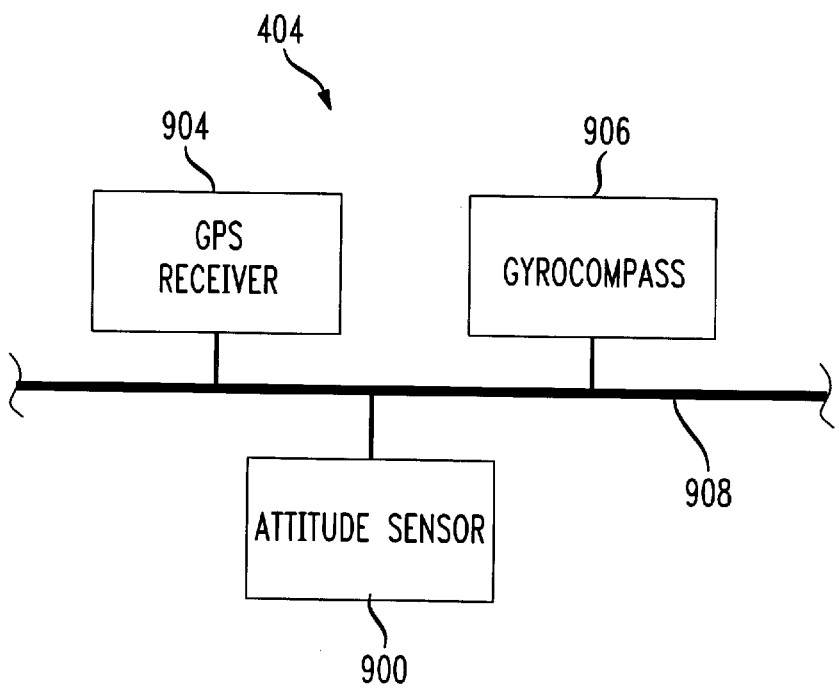
FIG. 7 is a block diagram of a steering information detector.

FIG. 7 is a block diagram of the position detector 404. The steering information detector 404 includes an attitude sensor 900, a GPS receiver 904 for receiving GPS signals and a gyrocompass 906. The above components are coupled together via a signal bus 908. The attitude sensor 900 determines the portable satellite phone 102's orientation relative to vertical or "plum line". The GPS receiver 904 receives GPS signals generated by the Global Positioning System indicating the position of the portable satellite phone 102. The gyrocompass 906 determines the azimuth and bearing of the portable satellite phone 102. The steering information detector 404 is coupled to the antenna controller 400 through the signal bus 908.

The directional antenna 402 may be any electronically steerable antenna. A class of phased array antennas is preferred. In general, a phased array of independent antenna elements may be configured in a linear, planar or volumetric array. Such an antenna may be electronically directed or steered by controlling the amplitude and phase of signals applied to each of the antenna elements. For example, an antenna beam of a planar array of uniformly spaced antenna elements can be steered in angular space by applying a signal to each of the antenna elements having a fixed time shift relative to the antenna elements. The shape of the antenna beam may be controlled by applying signals to each of the antenna elements having varying amplitudes relative to the other antenna elements. The amplitude of the signals applied to each antenna element may be weighted by multiplying by a respective weight value. An antenna beam pattern may be broadened or elongated by reducing or eliminating (weight equals 0) elements along an axis of the planar array.

Figure 8A:
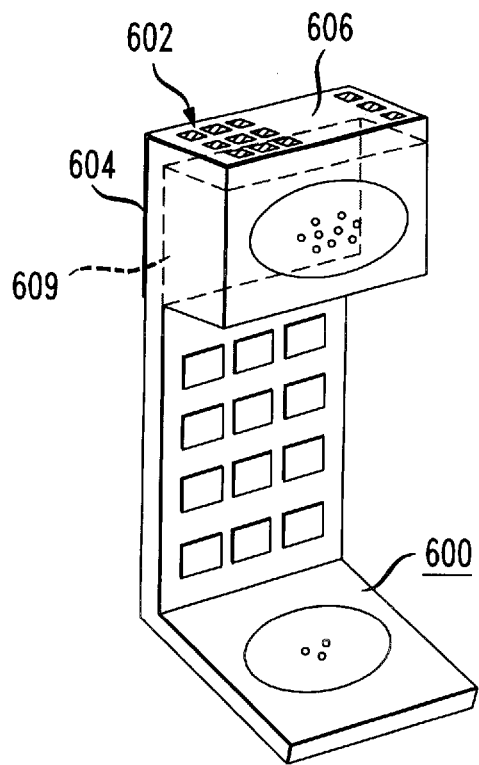
FIG. 8A shows a diagram of a portable satellite phone having a folded planar phased array directional antenna.
Figure 8B:
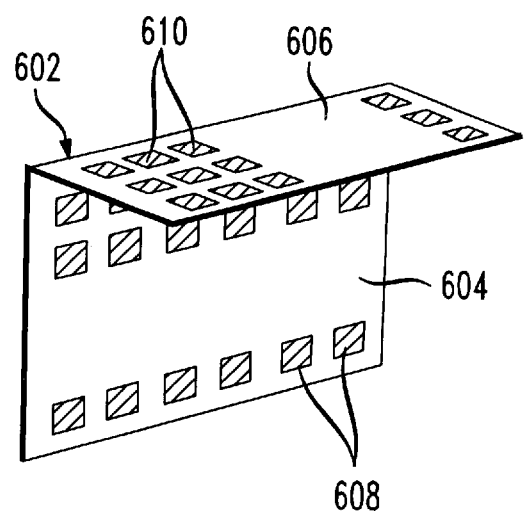
Fig. 8B shows a folded planar antenna phased array that may be used in the portable satellite phone of FIG. 8A.
Figure 8C:
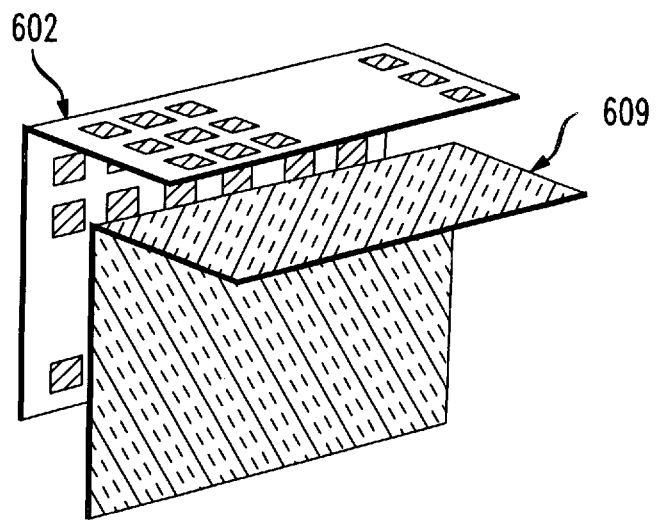
FIG. 8C shows a relationship of a shield to the folded planar antenna phased array of FIG. 8B.

FIG. 8A shows a folded planar phased array antenna 602 disposed on the back and top sides 604 and 606 of a portable satellite phone 600. FIG. 8B shows the folded planar phased array antenna 602 having antenna elements 608 uniformly disposed on the back side 604 and antenna elements 610 uniformly disposed on the top side 606 of the folded planar phased array antenna 602. The back and top sides 604 and 606 of the folded planar phased array antenna 602 act as a single planar array when the top antenna elements 610 are phase shifted by 90 degrees (in the plane perpendicular to the back and top sides 604 and 606) relative to those on the back side 604. The folded planar phased array antenna 602 has slightly better directionality than a planar array.

FIG. 8A shows a shield 609 that shields a user from the electromagnetic energy transmitted by the folded planer phased array antenna 602. As shown in FIG. 8A, the shield 609 is disposed between the folded planar array antenna 602 and an ear piece so that the user is shielded from the electromagnetic energy especially when the antenna phone 602 is positioned next to the user's head. The shield may include any metallic material and may be electrically grounded with respect to the folded planar array antenna 602.

The antenna gain and antenna directionality are proportional to a number of elements in the phased array antenna. At Ka band frequencies of 17–30 and 40 Ghz, the wavelength approaches 1.0 cm. A conformal antenna with quarter wavelength element spacings would occupy approximately 5×5 cm which can accommodate a 20×20 element array at these frequencies. A folded planar phased array located on the top and back sides 606 and 604 of the folded phased array antenna 602 may provide 20×8 elements on the top side 606 (~2×5 cm) and 20×20 elements on the back side 604 (~5×5 cm).

Figure 9A:
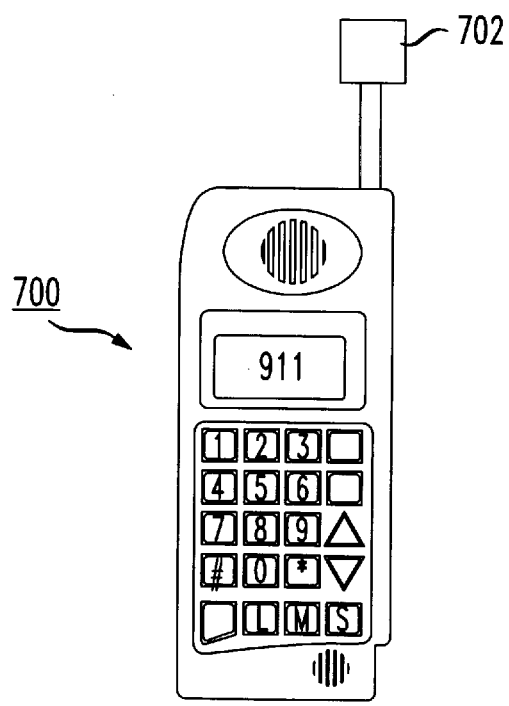
FIG. 9A shows a portable satellite phone having a volumetric phase array directional antenna.
Figure 9B:
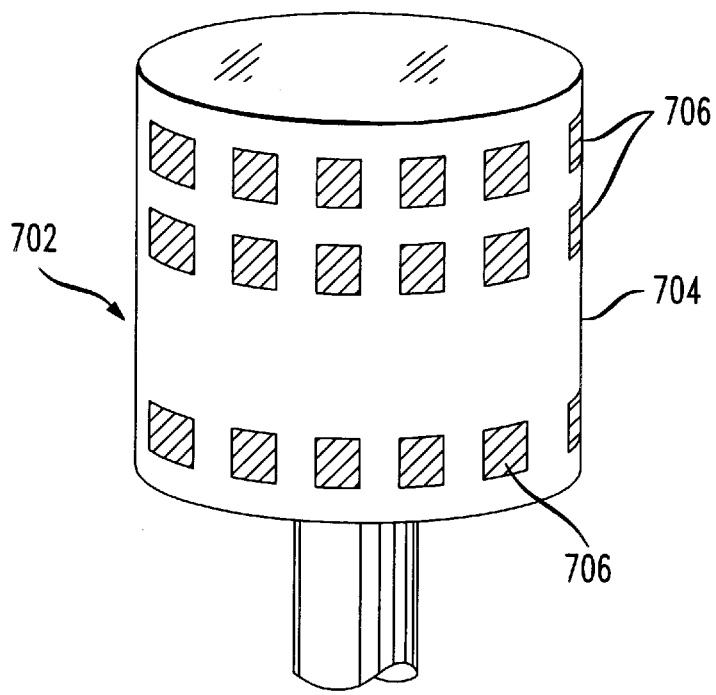
FIG. 9B shows a cylindrical volumetric phased array antenna that may be used with the portable satellite phone shown in FIG. 9A.

FIGS. 9A and 9B show another embodiment of a portable satellite phone 700 having a volumetric phased array antenna 702. As shown in FIG. 9B, the phased array antenna 702 includes a cylindrical antenna body 704 having antenna elements 706 uniformly disposed on the surface of the cylindrical body 704.

Figure 10:
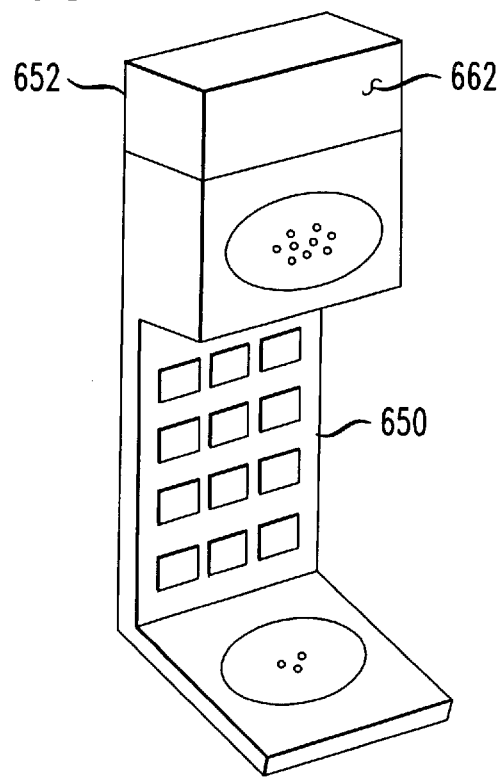
FIG. 10 shows a diagram of a portable satellite phone having a hat phased array antenna.

FIG. 10 shows an antenna phone 650 having a hat phased array antenna 652. The hat phased array antenna 652 is a volumetric phased array antenna where the space enclosed by the sides of the hat phased array antenna 652 is filled with antenna elements (not shown). The front surface 662 is a metallic shield, for example. The shield 662 may be disposed between the antenna array elements 670 and a user's head and may be a planar metallic shield embedded in the portable satellite phone 650.

For higher end Ka band frequencies and assuming a quarter wavelength spacing, the maximum number of antenna elements 670 and 706 for volumetric antennas 652 and 702, respectively, is approximately 64 times the cubic volume (in units of cm$^3$) of the antennas 652 and 702. The hat phased array antenna 652 on the top of the antenna phone 650 may have with a volume of roughly (2×25 cm or 20 cm$^3$) and may have over 1000 antenna elements 670.

Antenna array selection may depend on 1) high frequency electronics required for electronic steering; 2) electromagnetic properties of the antenna; and 3) dielectric and shielding structure. Ideally the spatial diversity of a volumetric array and a largest number of antenna elements 670 and 706 is most desirable. An antenna array with the largest gain and best directionality may be the most preferred.

Figure 11:
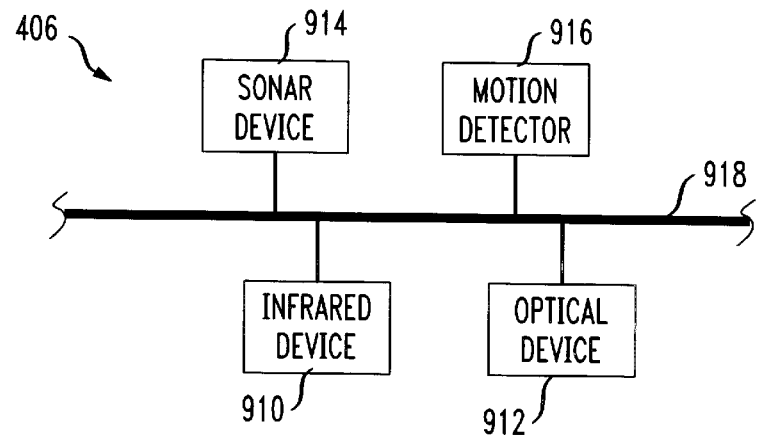
FIG. 11 is a block diagram of sensors for a proximity detector.

FIG. 11 shows a block diagram of the proximity detector 406. The proximity detector 406 may include an infrared device 910, an optical device 912, a sonar device 914 and a motion detector 916. The above components are coupled via bus 918 which also couples the proximity detector to the antenna controller 400. The function of the proximity detector 406 is to determine a distance of the object from the portable satellite phone 102 along the communication path formed by the directional antenna 402 that may interrupt the communication path or be harmed by electromagnetic energy transmitted by the directional antenna 402. In addition, a distance of the object from the communication path may also be determined. These distances together with a known antenna pattern of the antenna beam formed by the directional antenna 402 may be used to reduce the transmission power of the directed antenna 402 or adapt the antenna beam pattern to prevent physical harm to the object.

The infrared device 910 detects the presence of a human being by sensing an increase in the infrared energy relative to the background. The infrared device 910 is useful for detecting the presence of a person in a target area such as a neighborhood of the communication path formed by the antenna beam. The motion detector 916 detects the presence of an object formed by detecting a motion of the object. Similar devices common in home security systems use a plurality of infrared detectors or use sonic beam echoes to indicate the presence of a moving object.

The sonar device 914 may determine a distance and bearing of the object relative to the satellite antenna 102 and the antenna beam. The sonar device 914 may operate similarly to medical imaging devices or sonic tape-measuring devices commonly used in the building industry. A sonic pulse is emitted by the sonar device 914 and the round trip delay of the sonic pulse reflected from the object may be used to determine the distance and bearing of the object relative to the portable satellite phone 102.

The optical device 912 may also be used for determining range and bearing. Two lens systems may be provided to determine a focal distance to the object based on the parallax of the two lens systems. Optical parallax is commonly used in cameras for auto focusing. Parallax inherent in two lens systems are adjusted until the object is in focus. Since lens position is directly proportional to the distance to the object, this method may be applied to the proximity detection problem on the portable satellite phone 102 to directly measure a distance to the object. After dark, natural light may be supplemented with periodic flashes of light to periodically check for objects and determine their distance from the antenna beam.

A preferred embodiment of the proximity detector 406 is a combination of the optical device 912 that provides accurate ranging and the sonar device 914 that may provide general detection of the presence of an object as well as distance and bearing information.

Figure 12:
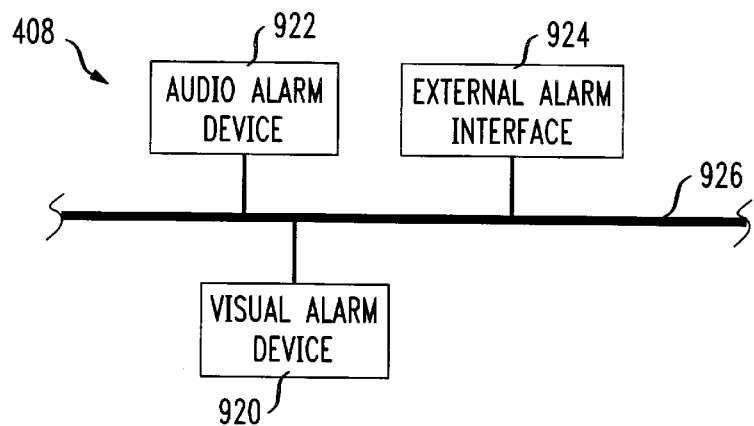
FIG. 12 is a block diagram of an alarm device.

FIG. 12 shows a block diagram of the alarm device 408. The alarm device includes a visual alarm device 920, an audio alarm device 922 and an external alarm interface 924. The above components are coupled to a signal bus 926 which also couples to the antenna controller 400.

The visual alarm device may include lights such as LEDs mounted on the portable satellite phone 102. The lights may be configured so that the lighting of a particular LED indicates a warning of possible physical harm while the lighting of another LED may indicate an inoperative condition. In addition, the LED may be placed on the portable satellite phone 102 to indicate to the user a suggested posture change to change the position of the portable satellite phone 102.

The audio alarm device 922 may generate audio alarm signals directly into the receiver of the portable satellite phone 102 instructing the user to either change the position of the portable satellite phone 102 or informing the user that an object is about to interfere with the antenna beam and cause a loss of communication with the satellite. The audio alarm device 922 may also include an audible alarm separate from the alarm generated in the receiver of the portable satellite phone 102. Such an audible alarm may alert a person (for example, the object) other than the user of the possible exposure to unacceptable levels of electromagnetic energy.

The alarm device 408 also includes an external alarm interface 924 that may be coupled to other alarm devices physically separate from the portable satellite phone 102. The external alarm interface 924 may include an infrared link to other alarm devices that may either warn or physically prevent an object from entering into an area that may be physically harmful.

Figure 13:
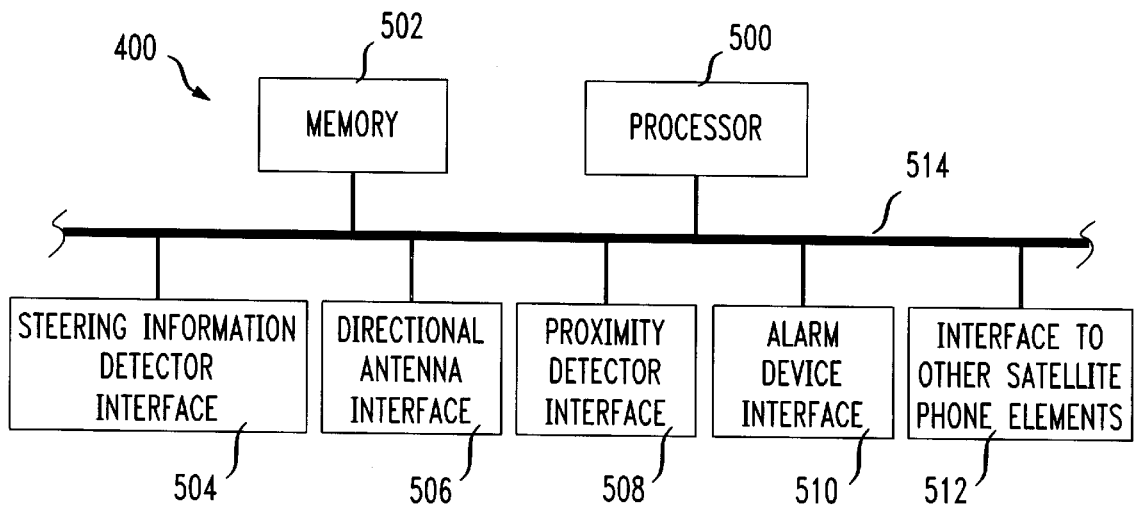
FIG. 13 is a block diagram of an antenna controller of the portable satellite phone shown in FIG. 5.

FIG. 13 is a block diagram of the antenna controller 400. The antenna controller 400 includes a processor 500, and a memory 502. The antenna controller 410 include interfaces to other components of the portable satellite phone 102. The interfaces are as follows: steering information detector interface 504, directional antenna interface 506, proximity detector interface 508, alarm device interface 510 and interface to other portable satellite phone elements 512. All of the above components are coupled together via a signal bus 514. Each of the interface components 504–512 contain the necessary devices required to interface with each respective device. For example, the directional antenna interface 506 includes all the electronics necessary to receive and transmit signals through the directional antenna as well as the necessary components required to form antenna beams in a desired direction.

The database that contains the satellite positional information is stored in the memory 502. Other information required for controlling and interfacing with each of the components of the portable satellite phone 102 as well as programs required for the processor 500 may also be stored in the memory 502.

When an instruction to establish a communication path is received from the other portable satellite phone elements 410 through the interface to other portable satellite phone elements 512, the processor 500 responds by determining whether the user is a calling party or a called party. If the user is a calling party, the processor searches the database in the memory 502 and selects an appropriate satellite of the satellite network 100 based on criteria such as cost, satellite position, etc. If the user is a called party, the processor 500 searches the database to determine a position of the destination satellite. Alternatively, the processor 500 may also receive information from the destination satellite during a call set up process.

After a satellite position is determined, the processor 500 interfaces with the steering information detector 404 through the steering information detector interface 504 to determine the position/bearing/attitude of the portable satellite phone 102. When both the satellite position and the position/bearing/attitude of the portable satellite phone 102 are determined, the processor 500 sends appropriate control information to the directional antenna 402 through the directional antenna interface 506 to direct an antenna beam toward the selected/destination satellite.

After the communication path to the selected/destination satellite is established, the processor 500 adaptively maintains the antenna beam directed to the selected/destination satellite by monitoring the satellite position as well as the position/bearing/attitude of the portable satellite phone 102 and adjusts the direction of the antenna beam by sending appropriate parameters to the directional antenna through the directional antenna interface 506. The processor 500 may also receive positional information from the selected/destination satellite to assist the processor 500 in directing the antenna beam.

During the call setup process and for the duration of the communication with the satellite, the processor 500 activates the proximity detector 406 to determine whether there are objects, such as people, within a predetermined distance from the antenna beam. When the proximity detector detects an object, the processor 500 determines the distance and bearing of the object based on the information received from the proximity detector 406. The processor 500 then takes alternative action such as redirecting the antenna beam, to another satellite for example, to prevent physical harm to the object, modify the antenna beam pattern to reduce a power level at the object while still communicating with the selected destination satellite, reduce the power transmitted by the directional antenna 402 and/or sending appropriate commands to the alarm device to output a warning of possible harm or loss of communication.

Figure 14:
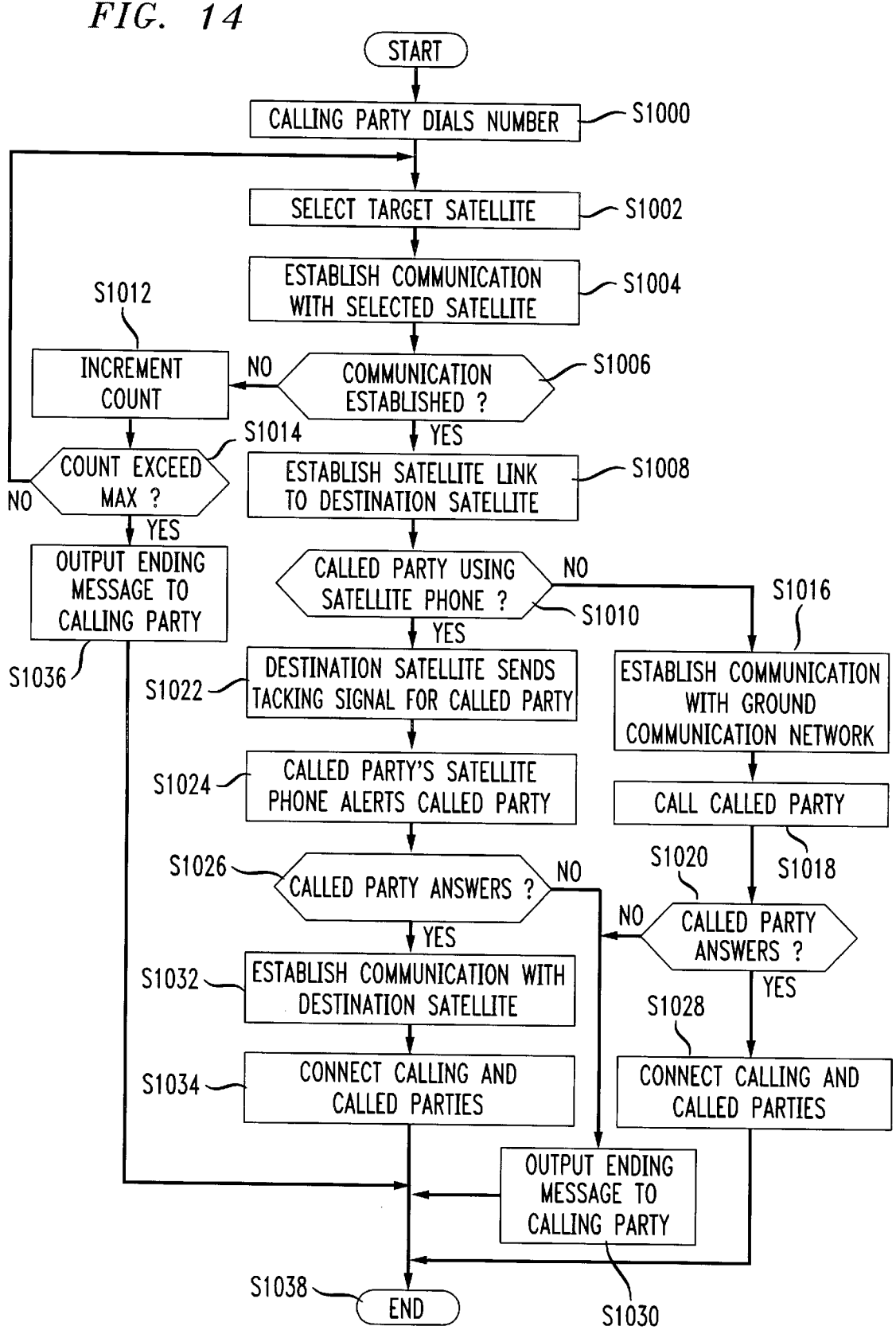
FIG. 14 shows a flowchart for a communication process using portable satellite phones.

FIG. 14 shows a process of communication using the portable satellite phone 102. In step S1000, a calling party dials a number using the portable satellite phone 102. When the calling party dials a number, the processor 500 of the portable satellite phone 102 receives an instruction from the other portable satellite phone elements 410 to establish communication with an appropriate satellite. Then the process goes to step S1002.

In step S1002, the processor 500 accesses the database stored in the memory 502 to determine which satellite of the satellite network 100 is most appropriate for the number dialed by the calling party. The satellite selection may be based on criteria such as cost, position of the satellites, and the capability of the satellite and the portable satellite phone 102 to establish a complete communication path from the portable satellite phone 102 to the called party. After the appropriate satellite is selected, the process goes to step S1004.

In step S1004, the processor 500 determines the position of the portable satellite phone 102 by accessing information from the position detector 404 through the position detector interface 504. After determining the position of the portable satellite phone 102, the processor 500 determines the proper direction of an antenna beam and sends appropriate control information to the directional antenna 402 through the directional antenna interface 506. Then the process goes to step S1006.

In step S1006, the processor determines whether communication with the selected satellite has been successfully established. If the communication with the selected satellite has not been established, the process goes to step S1012. If the communication is successfully established, the process goes to step S1008. In step S1012, the processor 500 increments a count and then goes to step S1014. In step S1014, the processor 500 determines whether the count has exceeded a maximum. If the count exceeded a maximum, the process goes to step S1036 and outputs an ending message to the calling party that communication cannot be established. Then the process goes to step S1038 and ends the communication process. If the count has not exceeded a maximum, the process returns to step S1012.

In step S1008, the selected satellite receives information from the portable satellite phone 102 and determines the appropriate destination satellite if the destination satellite is other than the selected satellite. Then the process goes to step S1010. In step S1010, the destination satellite (which could be the selected satellite) determines whether the number dialed by the calling party is the number for the portable satellite phone, portable satellite phone 104, for example. If the number is the number for the portable satellite phone 104, then the process goes to step S1022 to reach the called party by directly contacting the portable satellite phone 104. Otherwise, if the number dialed by the calling party is the number connected to a ground based communication network 200, then the process goes to step S1016.

In step S1022, the destination satellite outputs a signal to alert the called party that a call is pending. Then the process goes to step S1024. In step S1024, if the portable satellite phone 104 is in standby mode (e.g., not busy), then the portable satellite phone 104 alerts the called party that a call is pending. Then the process goes to step S1026.

In step S1026, the process waits for a predetermined time for the called party to answer the call through the portable satellite phone 104. If the called party answers the call within the predetermined amount of time, the process goes to step S1032. Otherwise, the process goes to step S1030. In step S1030, the destination satellite informs the selected satellite that the called party has failed to answer the call. The selected satellite in turn informs the calling party that the call is not answered in an ending message. Then the process goes to step S1038 and ends the communication process.

In step S1032, the portable satellite phone 104 establishes communication with the destination satellite by determining the position of the destination satellite and the position of the portable satellite phone 104 and forms a directed beam to the destination satellite. Then the process goes to step S1034. In step S1034, the calling party and the called party are connected in a call. After the call is completed, the process goes to step S1038 and ends the communication process.

In step S1016, the destination satellite establishes communication with a ground based communication network 200. Then the process goes to step S1018. In step S1018, the ground based communication network connects the call to a terminal such as a terminal 202 or a mobile phone 204 of the called party and goes to step S1020. In step S1020, the process waits for a predetermined amount of time for the called party to answer the call. If the called party answers the call then the process goes to step S1028. Otherwise, the process goes to step S1030. In step S1028, the calling party and the called party are connected in a call. After the call is completed, the process goes to step S1038 and ends the communication process.

After the portable satellite phones 102 and 104 establish communication with the respective satellites, each of the respective portable satellite phones 102 and 104 continues to monitor the positions of the portable satellite phones 102 and 104 and the respective satellites. The respective processors 500 continue to adaptively adjust the direction of the antenna beams so that the antenna beams are aimed at the respective satellites irrespective of the movement of the calling or called parties and the movement of the respective satellites.

In the event that the selected destination satellites are other than GEO satellites, the possibility exists for the respective satellites to move out of range of the respective portable satellite phones 102 and 104. If the selected/destination satellites move out of range, the portable satellite phones 102 and 104 must identify another satellite to continue the communication path by consulting the respective databases so that the call may continue without interruption. After identifying another satellite, the portable satellite phones 102 and 104 may transition from the original or first selected/destination satellites to the new or second selected/destination satellites by either a snap beam technique or a bridge beam technique.

Figure 15:
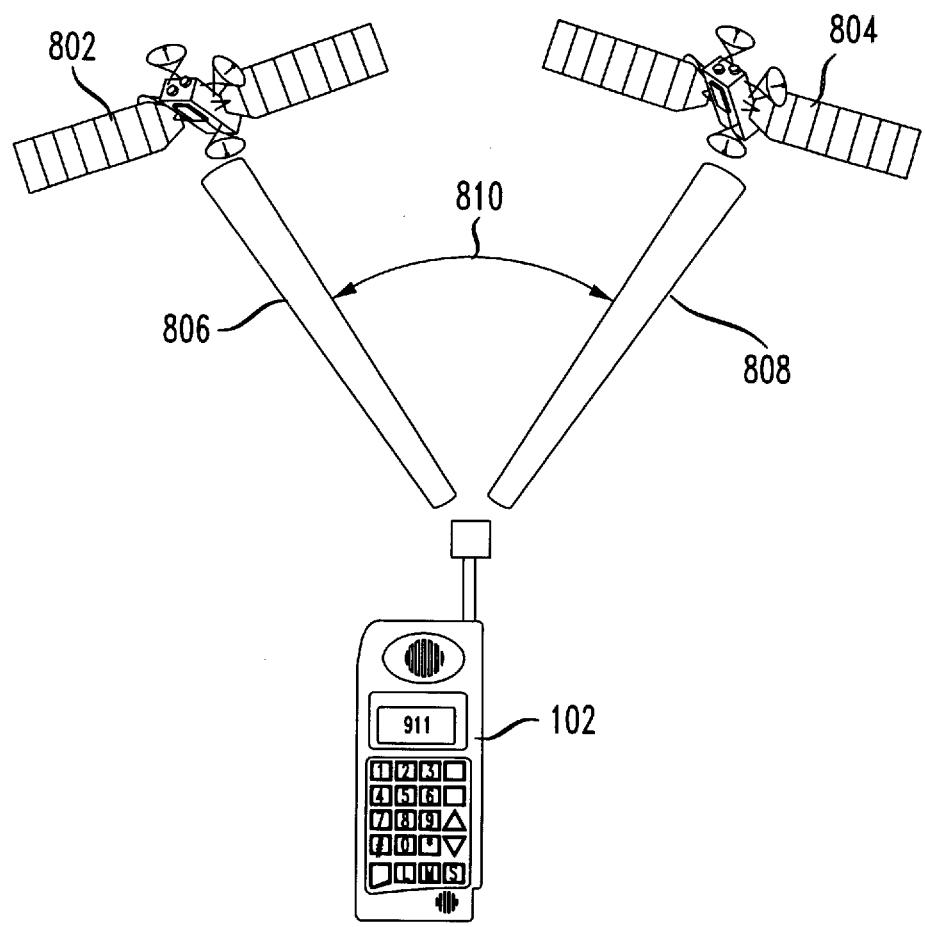
FIG. 15 shows a portable satellite phone changing communication paths between two satellites by snapping the antenna beam from one satellite to another satellite.

FIG. 15 shows a diagram of the snap beam technique that may be used to transition or "hand-off" from a first satellite 802 to a second satellite 804. As shown in FIG. 14, the portable satellite phone 800 communicates with the first satellite 802 through antenna beam 806. Before the first satellite 802 goes out of range, the portable satellite phone 800 determines the position of the second satellite 804 and, at an appropriate moment, transitions the communication path from antenna beam 806 to antenna beam 808 in the direction of 810. Thus, the antenna beam is snapped from a direction of antenna beam 806 to a direction of antenna beam 808 transitioning the communication path from the first satellite 802 to the second satellite 804.

Figure 16:
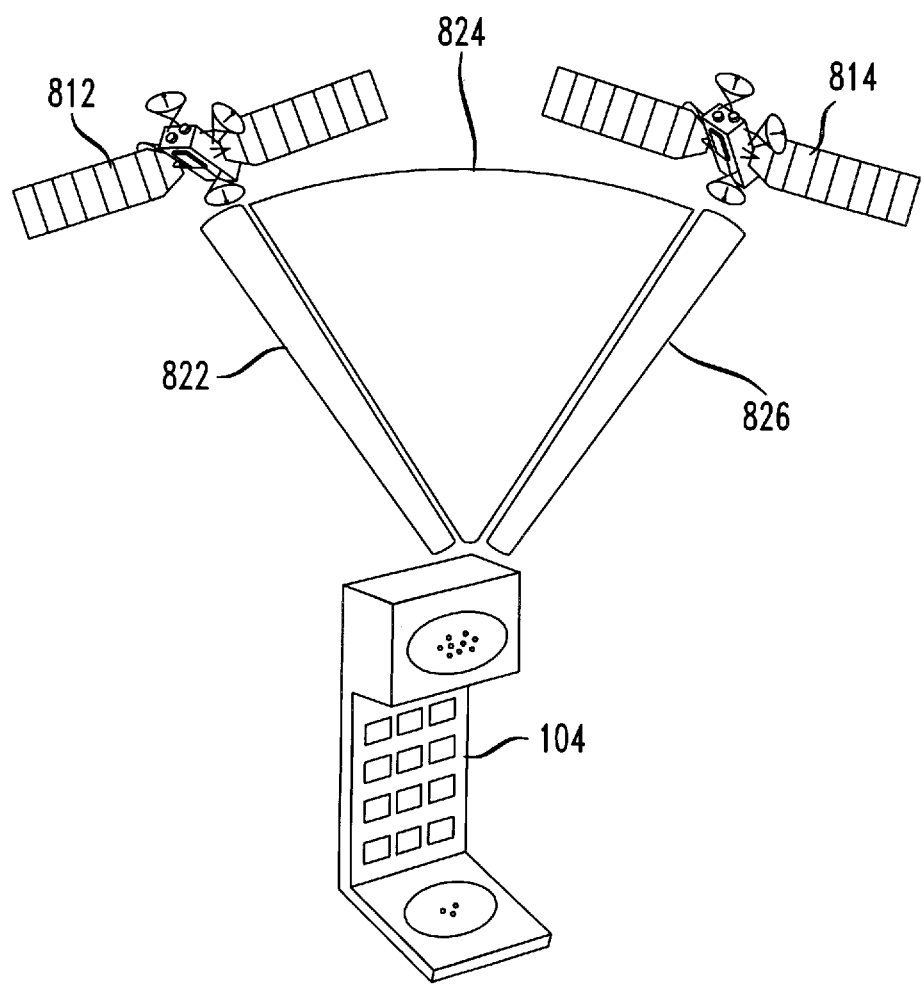
FIG. 16 shows a portable satellite phone changing communication paths from one satellite to another satellite by forming a bridging beam.

FIG. 16 shows a second possible method for transitioning between a first satellite 812 and a second satellite 814. The portable satellite phone 820, for example, communicates with the first satellite 812 through antenna beam 822. When the first satellite 812 is moving out of range, the portable satellite phone 820 locates the second satellite 814 and converts the antenna beam 822 into a bridge beam 824 that permits communication with both the first and second satellites 812 and 814. When the communication path transition from the first satellite 812 to the second satellite 814 is completed, the bridge beam 824 is converted to a narrow beam 826 aimed directly at the second satellite 814. Thus, the transition between the first and second satellites 812 and 814 may be achieved without interrupting the communication between the calling and the called parties.

For hand-offs between LEO, ICO or MEO 308, 306 and 312 satellites, the beam bridging technique is generally more widely applicable, since no precise timing coordination between the satellite network 100 and the antenna phones 800 and 820 is required. A bridging beam can be directed at both satellites 800 and 820 for seconds or minutes to ensure a seamless hand-off. The snap beam hand-off between adjacent satellites 802 and 804, for example, requires some timing coordination between the satellites 802 and 804 and the portable satellite phones 800 and 820. Alternately, the snap beam technique with the satellites 802 and 804 bridging the signal across both satellites 802 and 804 would obviate the need for precision hand-off timing.

Figure 17:
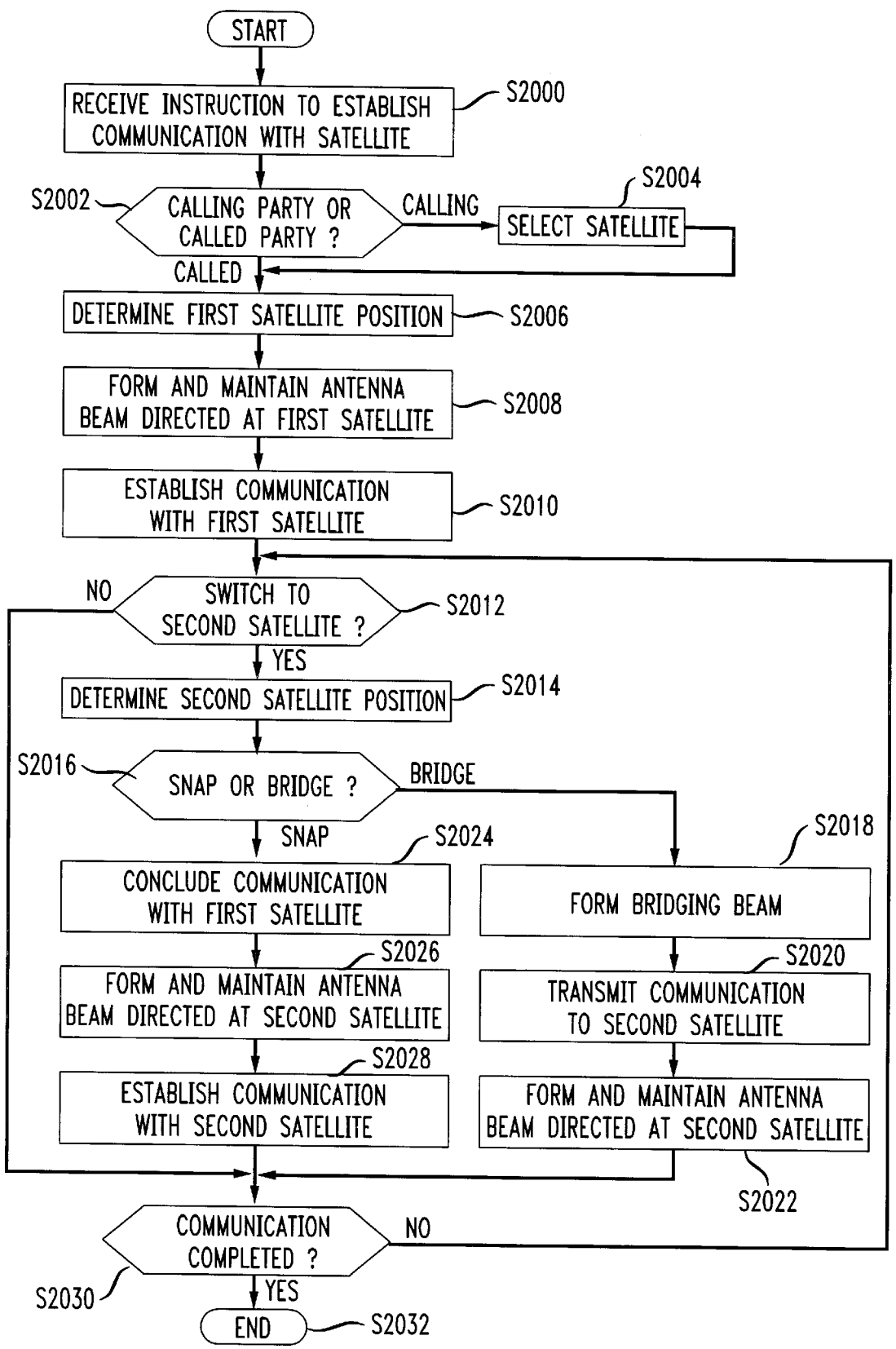
FIG. 17 shows a process of the portable satellite phone forming and adaptively maintaining an antenna beam directed at a satellite.

FIG. 17 shows a flowchart of the process of transitioning between a first satellite and a second satellite by the portable satellite phone 102. In step S2000, the portable satellite phone 102 receives an instruction to establish communication with a satellite. Then the process goes to step S2002. In step S2002, the processor 500 determines whether the user is a calling party or a called party. If the user is a calling party, the processor 500 goes to step S2004. Otherwise, the first satellite is the destination satellite and the processor 500 goes to step S2006. In step S2004, the processor 500 selects a first satellite from the satellite network 100. Then the processor 500 goes to step S2006.

In step S2006, the processor 500 determines the first satellite position and goes to step S2008. In step S2008, the processor 500 forms and adaptively maintains an antenna beam directed at the first satellite. Then the processor 500 goes to step S2010. In step S2010, the processor 500 establishes communication with the first satellite and goes to step S2012. In step S2012, the processor 500 determines whether it is necessary to switch to a second satellite. If it is necessary to switch to a second satellite, the processor 500 goes to step S2014. Otherwise, the processor 500 goes to step S2030. In step S2030, the processor determines whether the communication between the calling and called parties is completed. If the communication between the calling and called parties is completed, the processor 500 goes to step S2032 and ends the process. Otherwise, the processor 500 returns to step S2012.

In step S2014, the processor 500 determines a second satellite position. Then the processor 500 goes to step S2016. In step S2016, the processor 500 determines whether to utilize the snap or beam bridge process. If the processor 500 decides to use the snap beam process, the processor 500 goes to step S2024. Otherwise, the processor 500 goes to step S2018.

In step S2024, the processor 500 concludes the communication with the first satellite. The processor 500 may determine the timing for concluding the communication with the first satellite and begin the snap hand-off process or alternatively, the processor 500 receives a synchronization signal from the first satellite that initiates the snap hand-off process. The processor 500 goes to step S2026. In step S2026, the processor 500 forms and adaptively maintains an antenna beam directed at a second satellite. Then the processor 500 goes to step S2028. In step S2028, the processor 500 establishes communication with the second satellite and goes to step S2030.

In step S2018, the processor 500 expands the antenna beam directed toward the first satellite into a bridging beam between the first and second satellites and goes to step S2020. In step S2020, the processor 500 transitions the communication from the first satellite to the second satellite and goes to step S2022. In step S2022, the processor 500 narrows the bridging beam into an antenna beam directed at the second satellite and adaptively maintains the antenna beam toward the second antenna. Then the processor 500 goes to step S2030.

Figure 18:
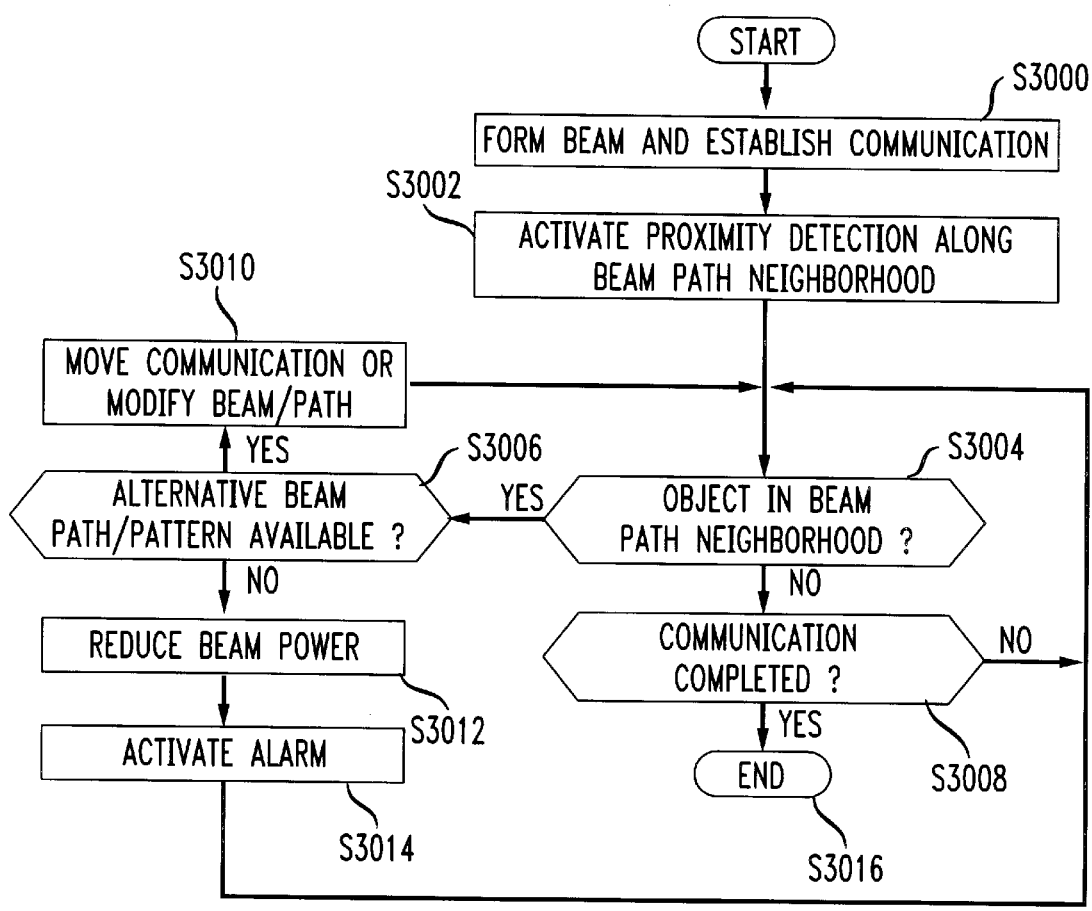
FIG. 18 shows a portable satellite phone process for responding to objects that interfere with a beam path of the portable satellite phone.

FIG. 18 shows a flowchart of a response of the portable satellite phone 102 to an object that comes into a beam path neighborhood of the antenna beam. In step S3000, the processor 500 forms an antenna beam and establishes communication with a satellite. Then the processor 500 goes to step S3002. In step S3002, the processor 500 activates the proximity detector along a beam path neighborhood. A beam path neighborhood is determined by a predetermined distance from the antenna beam and the portable satellite phone 102. Then the processor 500 goes to step S3004.

In step S3004, the processor 500 determines whether an object has entered into the beam path neighborhood. If an object has not entered into a beam path neighborhood, the processor 500 goes to step S3008. Otherwise, if an object has entered into the beam path neighborhood, then the processor 500 goes to step S3006. In step S3008, the processor 500 determines whether the communication between the calling and called parties has completed. If the communication has completed, the processor 500 goes to step S3016 and ends the process. Otherwise, the processor 500 returns to step S3004.

In step S3006, the processor 500 determines whether alternative antenna beam paths are available. If alternative beam paths are available, then the processor 500 goes to step S3010. Otherwise, the processor 500 goes to step S3012. In step S3010, the processor 500 reshapes the antenna beam to move the communication to a new beam path so that the beam path neighborhood avoids the object that entered the original beam path neighborhood. This process may include switching to another satellite. Then the processor 500 goes to step S3004.

In step S3012, the processor 500 reduces the beam power of the antenna beam and then goes to step S3014. In step S3014, the processor 500 activates the alarm device to alert the user and/or the object that entered into the beam path neighborhood of potential harm. Then the processor 500 goes to step S3004.

FIG. 19 shows a diagram of a communication system that includes fixed phased array antennas 908, 910, 926 and 928 that are fixed to permanent structures 904, 906, 922 and 924, respectively. The permanent structures 904 and 906 are located in the Northern Hemisphere such as the United States 902, while the permanent structures 922 and 924 are located in the Southern Hemisphere such as in Australia 920. Phased arrays 908 and 926 may be planar phased arrays mounted on structures such as houses and phased arrays 910 and 928 may be volumetric phased arrays mounted on towers such as for terrestrial wireless transmitters/receivers. The fixed phased array antennas 908, 910, 926 and 928 may form directed antenna beams. For example, the phase array antenna 908 may form beams 916 and 918; the phased array antenna 910 may form antenna beams 912 and 914; the phased array antenna 926 may form beams 934 and 936; and the phased array 928 may form beams 930 and 932. The phased array antennas 908, 910, 926 and 928 form the respective directed beams toward satellites such as satellites 938, 940, 942 and 944 that may have orbits along the equator 950. Other satellites that have other orbits may also be reached by the fixed array antennas 908, 910, 926 and 928.

The above-described phased array antenna systems that are attached to permanent structures may be used for satellite cable TV and broadband terrestrial links such as multimedia direct satellite and wireless cable. Using the electronically steerable phased array antennas 908, 910, 926 and 928, installation of the phased array antenna facilities may be simply locating the antennas in a general direction facing the satellites. Thus, the phased array antennas 908, 910, 926 and 928 eliminate the need for complex mechanical installations where the antennas must be carefully aimed at destinations and sources. These fixed phased array antennas provide at least two unique benefits: simple, auto-steering during installation for ease of use, and terminal access to multiple satellite services.

In addition, the antenna systems may either receive users' location/address (latitude and longitude) or alternatively use built-in GPS localization to compute a correct steering direction to electronically steer antenna beams for optimum reception. Further, the electronically-steered antennas can be redirected under user control for aiming antenna beams at selected satellites to take advantage of terrestrial service nodes. Thus, using a single electronically-steered antenna system permits the user to receive service for multiple systems.

Moreover, fixed phased array antennas 908, 910, 926 and 928 that transmit signals using directed or non-directed beams may also apply proximity detection of objects that may be harmed by the electromagnetic energy. If objects are detected, alternative actions may be taken by redirecting the antenna beam, reducing the power of transmitted electromagnetic energy and/or activating an alarm to warn of possible harm.

While this invention has been described in conjunction with specific embodiments thereof, it is evident that many alternatives, modifications and variations will be apparent to those skilled in the art. In particular, while portable satellite phones 102 and 104 have been described by way of example, this invention is applicable to other devices such as cars and airplanes that may benefit from forming highly directed antenna beams to conserve power and to reach destinations such as other satellites or other receiving devices. In addition, although the above embodiments are described in conjunction with a portable satellite phone, the invention is applicable to other devices such as facsimile devices.

For simple embodiments, the portable satellite phones 102 and 104 may include a simple compass and level to assist users in orientating the portable satellite phones 102 and 104. These simple instruments provide rough attitude and bearing information for the user so that the portable satellite phones 102 and 104 may be properly and approximately orientated at night or in a dense fog situation, for example.

Also, the alarm device 408 may include a mechanical alarm such as a vibrator. This additional alarm mode enables hearing and/or vision impaired users to be alerted of antenna beam interference conditions.

Accordingly, preferred embodiments of the invention as set forth herein are intended to be illustrative, not limiting. Various changes may be made without departing from the spirit and scope of the invention as defined in the following claims.

What is claimed is:

1. A communication terminal that includes an antenna, an antenna controller and a proximity detector, the proximity detector comprising:

a sensor that detects a proximity of an object to at least one of the communication terminal and an antenna beam formed by the communication terminal, the antenna controller controlling the antenna based on an output of the proximity detector while said communication terminal continually maintains communication.

2. The communication terminal of claim 1, wherein based on an output of the sensor, the proximity detector determines a distance of the object from at least one of the communication terminal and the antenna beam of the antenna.

3. The communication terminal of claim 2, wherein the antenna controller changes a power output through the antenna based on the distance determined by the proximity detector.

4. The communication terminal of claim 3, wherein the antenna controller reduces the power output through the antenna based on the distance determined by the proximity detector.

5. The communication terminal of claim 2, wherein the antenna controller changes a direction of the antenna beam based on the distance determined by the proximity detector.

6. The communication terminal of claim 2, wherein the antenna controller changes a shape of the antenna beam based on the distance determined by the proximity detector.

7. The communication terminal of claim 2, further comprising an alarm, the antenna controller activating the alarm when the object is within a predetermined distance of at least on of the communication terminal and the antenna beam.

8. The communication terminal of claim 7, wherein the alarm comprises at least one of an audible alarm, a visual alarm and a mechanical alarm.

9. The communication terminal of claim 1, wherein the sensor of the proximity detector comprises at least one of a sonar sensor, an infrared sensor, a motion sensor and an optical sensor.

10. A method for operating a proximity detector and a communication terminal that includes the proximity detector, an antenna and an antenna controller, the method comprising:

detecting a proximity of an object to at least one of the communication terminal and an antenna beam formed by the communication terminal; and controlling the antenna based on the detected proximity while continually maintaining communication.

11. The method of claim 10, further comprising determining a distance of the object from at least one of the communication terminal and the antenna beam of the antenna.

12. The method of claim 11, wherein the controlling step comprises changing a power output through the antenna based on the distance determined by the determining step.

13. The method of claim 12, wherein the changing step comprises reducing the power output through the antenna based on the distance determined by the determining step.

14. The method of claim 10, wherein the changing step comprises changing a direction of the antenna beam based on the distance determined by the determining step.

15. The method of claim 10, wherein the changing step comprises changing a shape of the antenna beam based on the distance determined by the determining step.

16. The method of claim 10, further comprising activating an alarm, the antenna controller activating the alarm when the object is within a predetermined distance of at least on of the communication terminal and the antenna beam.

17. The method of claim 16, wherein the alarm comprises at least one of an audible alarm, a visual alarm and a mechanical alarm.

18. The method of claim 10, wherein the detecting step detects the proximity of the object by using at least one of a sonar sensor, an infrared sensor, a motion sensor and an optical sensor.

\* \* \* \* \*